United States Patent
Shan

(10) Patent No.: US 10,605,503 B2
(45) Date of Patent: Mar. 31, 2020

(54) CONDENSATE ENHANCED SUBCOOLER

(71) Applicant: DENSO International America, Inc., Southfield, MI (US)

(72) Inventor: Zhiwei Shan, Farmington Hills, MI (US)

(73) Assignee: DENSO International America, Inc., Southfield, MI (US)

(*) Notice: Subject to any disclaimer, the term of this patent is extended or adjusted under 35 U.S.C. 154(b) by 134 days.

(21) Appl. No.: 15/940,175

(22) Filed: Mar. 29, 2018

(65) Prior Publication Data
US 2019/0301779 A1 Oct. 3, 2019

(51) Int. Cl.
*F25B 40/02* (2006.01)
*F25D 17/06* (2006.01)
*F25D 21/14* (2006.01)
*F25B 13/00* (2006.01)

(52) U.S. Cl.
CPC .............. *F25B 40/02* (2013.01); *F25B 13/00* (2013.01); *F25D 17/067* (2013.01); *F25D 21/14* (2013.01)

(58) Field of Classification Search
CPC .......... F25B 40/02; F25B 13/00; F25D 21/14; F25D 17/067; F28D 5/00
See application file for complete search history.

(56) References Cited

U.S. PATENT DOCUMENTS

| | | | |
|---|---|---|---|
| 7,013,658 B2 | 3/2006 | Dobmeier et al. | |
| 7,150,160 B2 * | 12/2006 | Herbert | F24F 12/006 62/274 |
| 8,561,420 B2 | 10/2013 | Kakizaki et al. | |
| 2005/0166614 A1 * | 8/2005 | Dobmeier | F25B 40/02 62/150 |
| 2014/0116068 A1 * | 5/2014 | Uselton | F25B 21/02 62/3.2 |

* cited by examiner

*Primary Examiner* — Ana M Vazquez
(74) *Attorney, Agent, or Firm* — Harness, Dickey & Pierce, P.L.C.

(57) ABSTRACT

A refrigerant subcooling system including a water collector configured to collect water condensate from an evaporator. A heat exchanger defines a channel configured to accommodate a refrigerant conduit extending therethrough. The heat exchanger includes a water mist generator connected to the water collector by a water line to receive the water condensate from the water collector. The water mist generator is configured to generate a mist of the water condensate that mixes with air flowing through the channel and along the refrigerant conduit to cool refrigerant therein.

20 Claims, 3 Drawing Sheets

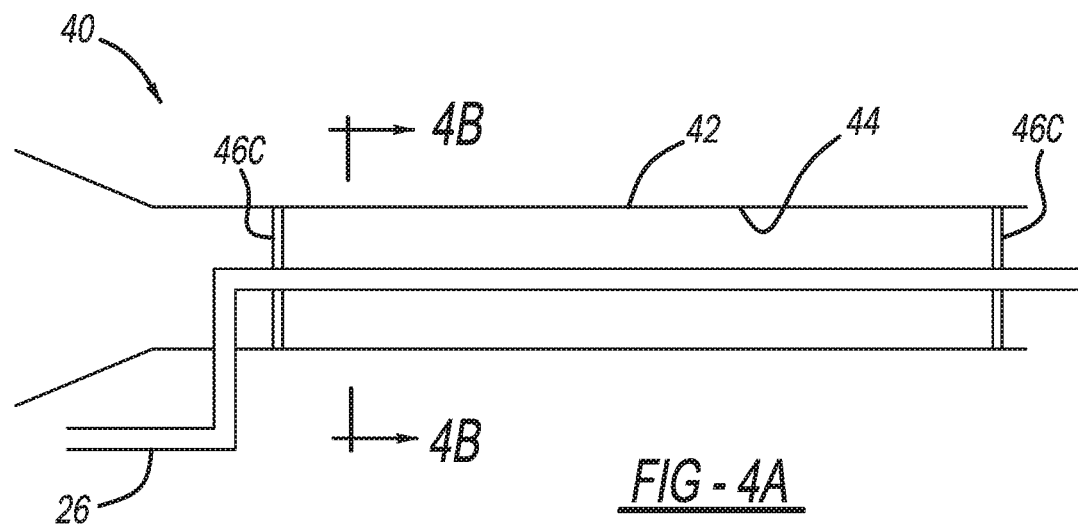
FIG-4A
FIG-4B
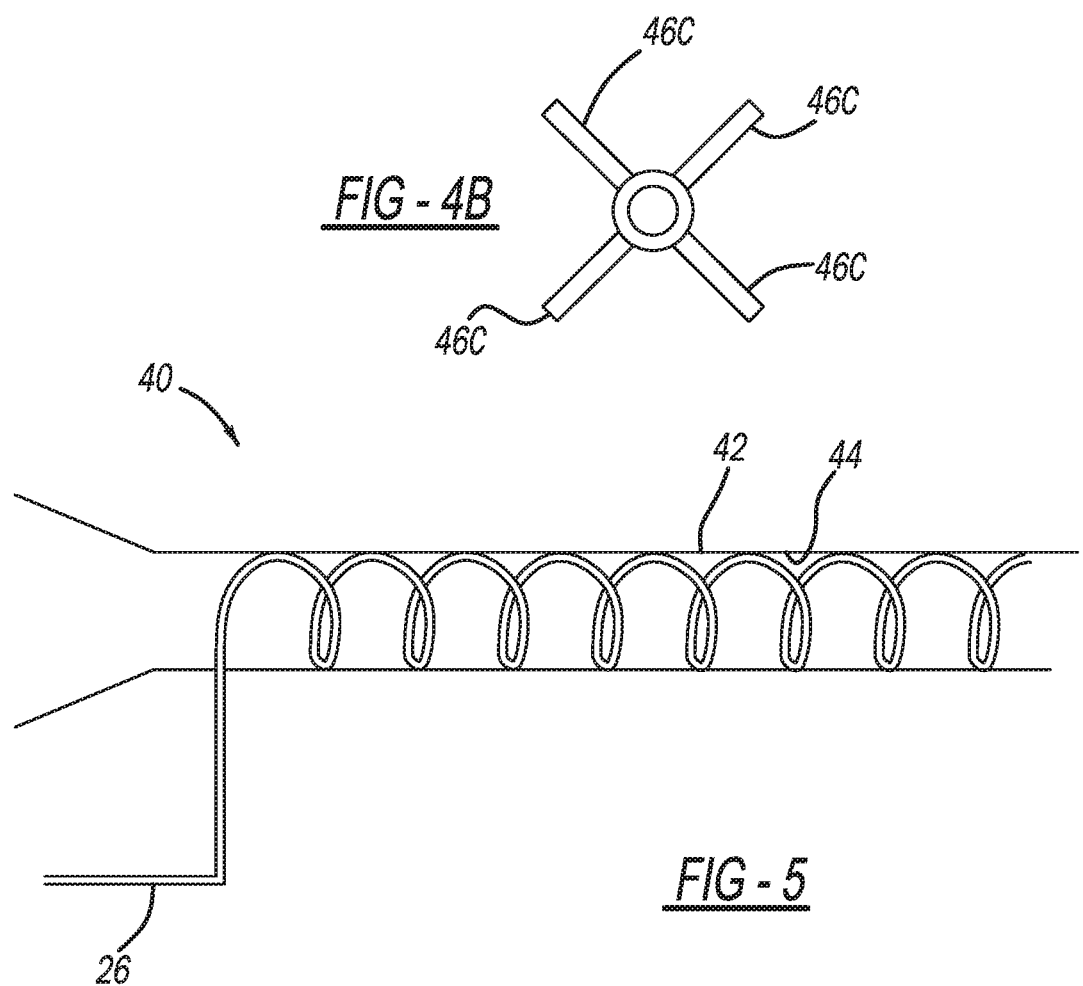
FIG-5

CONDENSATE ENHANCED SUBCOOLER

FIELD

The present disclosure relates to a condensate enhanced subcooler, such as for cooling refrigerant of an air conditioning system.

BACKGROUND

This section provides background information related to the present disclosure, which is not necessarily prior art.

In current automotive air conditioning (AC) systems, water condensate generated from the evaporator drips out from the HVAC module and goes to waste. A significant amount of the cooling capacity of AC systems is used to generate the condensate, and a significant amount of cooling capacity is stored within the condensate. It would therefore be desirable to make use of the evaporator condensate in a manner that improves the overall efficiency of the AC system. The present disclosure advantageously uses the cooling capacity stored as latent heat inside the evaporator condensate to increase the cooling capacity and efficiency of the AC system. One skilled in the art will appreciate that the present disclosure provides numerous additional advantages and unexpected results as well.

SUMMARY

This section provides a general summary of the disclosure, and is not a comprehensive disclosure of its full scope or all of its features.

The present disclosure includes a refrigerant subcooling system including a water collector configured to collect water condensate from an evaporator. A heat exchanger defines a channel configured to accommodate a refrigerant conduit extending therethrough. The heat exchanger includes a water mist generator connected to the water collector by a water line to receive the water condensate from the water collector. The water mist generator is configured to generate a mist of the water condensate that mixes with air flowing through the channel and along the refrigerant conduit to cool refrigerant therein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 4A illustrates an additional exemplary air circulator of the heat exchanger included with the refrigerant sub cooling system of FIG. 1;

FIG. 4B is a cross-sectional view taken along line 4B-4B of FIG. 4A; and

FIG. 5 illustrates a refrigerant conduit of the air conditioning system of FIG. 1 extending through the heat exchanger.

Corresponding reference numerals indicate corresponding parts throughout the several views of the drawings.

DETAILED DESCRIPTION

Example embodiments will now be described more fully with reference to the accompanying drawings.

Figure 1:
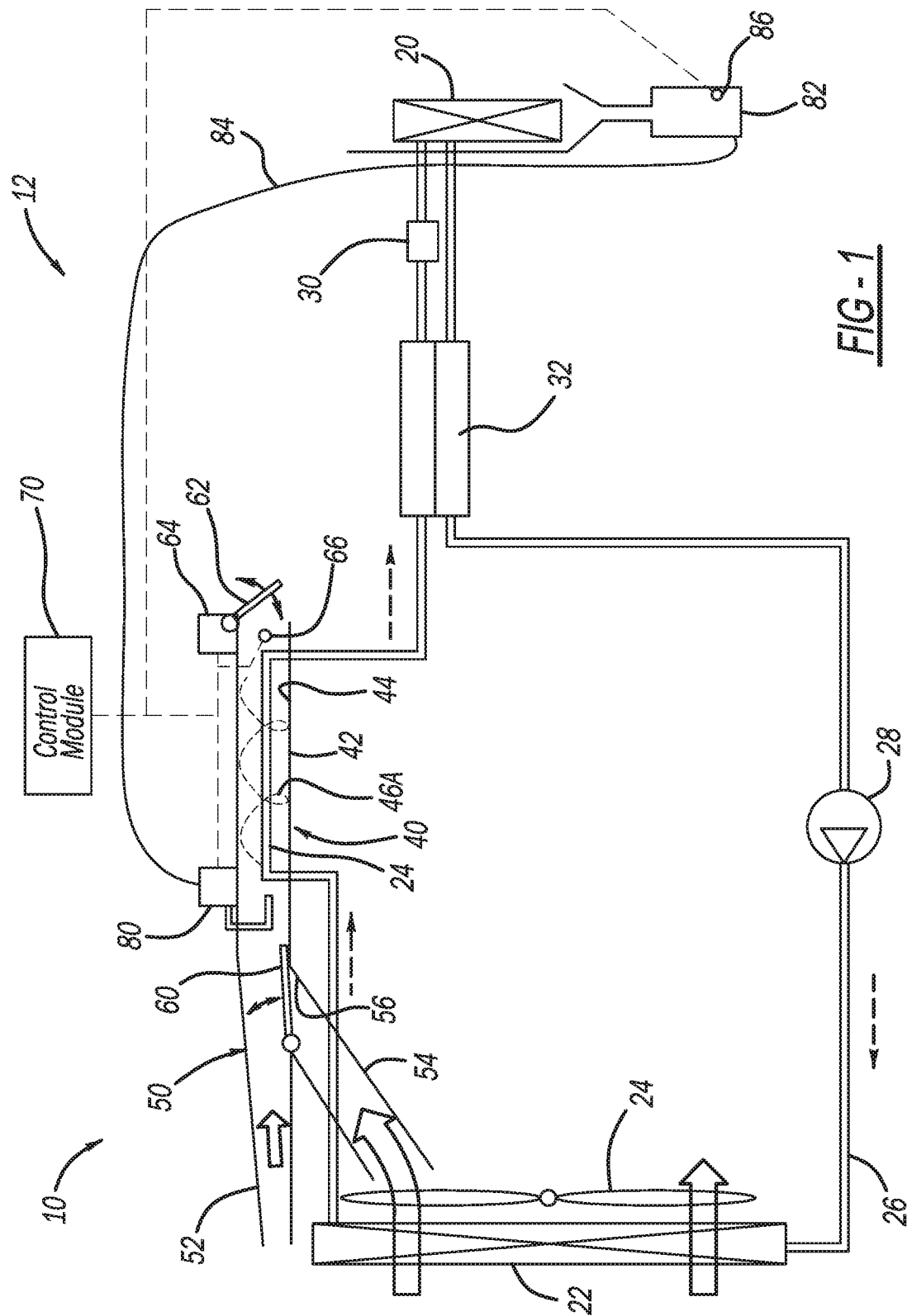
FIG. 1 illustrates an exemplary air conditioning system including a refrigerant subcooling system in accordance with the present disclosure.

FIG. 1 illustrates a refrigerant subcooling system 10 in accordance with the present disclosure as installed within an exemplary air conditioning system 12. The air conditioning system 12 can be any suitable air conditioning system, such as for a vehicle. Exemplary vehicles include, but are not limited to, passenger vehicles, utility vehicles, recreational vehicles, sport utility vehicles, mass transit vehicles, commercial vehicles, construction equipment, military vehicles, watercraft, aircraft, etc. The refrigerant subcooling system 10 may also be used with non-vehicular applications, such as building air conditioning systems, as well as any other systems in which it would be advantageous to subcool a refrigerant.

The air conditioning system 12 generally includes an evaporator 20, a condenser 22, a fan 24 for generating airflow across the condenser 22, and a refrigerant conduit 26 arranged to circulate refrigerant between the evaporator 20 and the condenser 22. The refrigerant is circulated through the refrigerant conduit 26 by a compressor 28. Arranged along the refrigerant conduit 26 between the evaporator 20 and the condenser 22 is an expansion valve 30, and an internal heat exchanger 32.

The refrigerant subcooling system 10 includes a heat exchanger 40, which can be arranged at any suitable position along the refrigerant conduit 26. In the example illustrated, the heat exchanger 40 is between the condenser 22 and the internal heat exchanger 32. In other applications, the heat exchanger 40 may be arranged between the compressor 28 and the condenser 22, or between the internal heat exchanger 32 and the expansion valve 30, for example.

The heat exchanger 40 includes an outer wall 42, which defines a channel 44. The heat exchanger 40 is arranged such that the refrigerant conduit 26 extends through the channel 44. The heat exchanger 40 may include an air circulator 46A within the channel 44 to facilitate circulation of air and water mist about the refrigerant conduit 26, as further described herein.

Airflow is directed to the heat exchanger 40 by an air intake duct 50. The air intake duct 50 includes a first intake portion 52 and a second intake portion 54. In vehicular applications, the first intake portion 52 is arranged to receive ram air. The second intake portion 54 is arranged to receive airflow generated by the fan 24. A passageway 56 is defined between the first intake portion 52 and the second intake portion 54. A first door 60 is mounted at the passageway 56. The first door 60 is passively controlled (i.e., is not moved by an actuator) by air pressure. Thus when the vehicle is idling or traveling at a slow speed, airflow generated by the fan 24 will rotate or blow the first door 60 to open (or at least partially open) the passageway 56 to allow airflow generated by the fan 24 to flow through the second intake portion 54 and through the channel 44. When the vehicle is traveling at higher speeds, ram air flowing through the first intake portion 52 will be significant enough to force the first door 60 towards the passageway 56 to close (or partially close) the passageway 56 to allow ram air to flow through the channel 44.

At a downstream (or back end) of the channel 44 is a second door 62. The second door 62 is actively actuated by a door actuator 64, which can be a servo or any other suitable actuator. Proximate to the second door 62, exposed to airflow passing through the channel 44, is a humidity sensor 66. The humidity sensor 66 measures the relative humidity, and inputs data representing the relative humidity of the channel 44 to a control module 70.

In this application, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module 70 described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 70 controls the position of the second door 62 (by way of the door actuator 64) to regulate airflow rate through the channel 44 so that airflow exiting the heat exchanger 40 has a relative humidity of 90% (or about 90%), which provides enhanced cooling of refrigerant flowing through the refrigerant conduit 26.

The heat exchanger 40 further includes a mist generator 80, which generates water mist and introduces the water mist to the channel 44. The mist generator 80 generates mist from condensate from the evaporator 20, which is collected by a condensate water collector 82. A water line 84 connects the condensate water collector 82 and the mist generator 80 to transport condensate from the collector 82 to the mist generator 80. The collector 82 includes a water level sensor 86, which is in communication with the control module 70 to allow the control module 70 to monitor the amount of condensate within the collector 82.

The control module 70 operates the mist generator 80 in conjunction with the door actuator 64 to maintain the relative humidity of airflow in the channel 44 at 90% (or about 90%) relative humidity. By mixing the water mist with airflow passing along the refrigerant conduit 26 the heat exchanger 40 of the present disclosure advantageously cools the liquid refrigerant passing therethrough. As a result, refrigerant flowing to the evaporator 20 is super cooled and has a lower enthalpy, which means that the refrigerant can absorb a greater amount of heat from a desired environment (e.g., a vehicle passenger cabin) without having to increase the rate of the compressor 28, which conserves energy.

Figure 2:
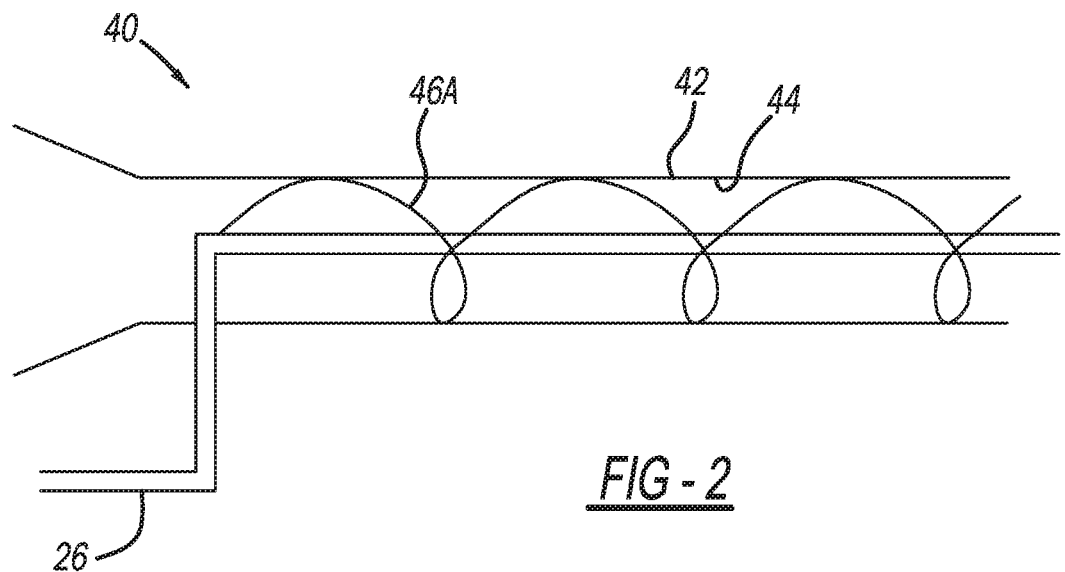
FIG. 2 illustrates an exemplary air circulator of a heat exchanger included with the refrigerant sub cooling system of FIG. 1.

With reference to FIG. 2, the air circulator 46A is illustrated in greater detail. In the example of FIG. 2, the air circulator 46A is helically shaped and extends around the refrigerant conduit 26 in order to circulate the mixture of air and mist generated by the mist generator 80 about the refrigerant conduit 26 to facilitate cooling of refrigerant flowing therethrough.

Figure 3A:
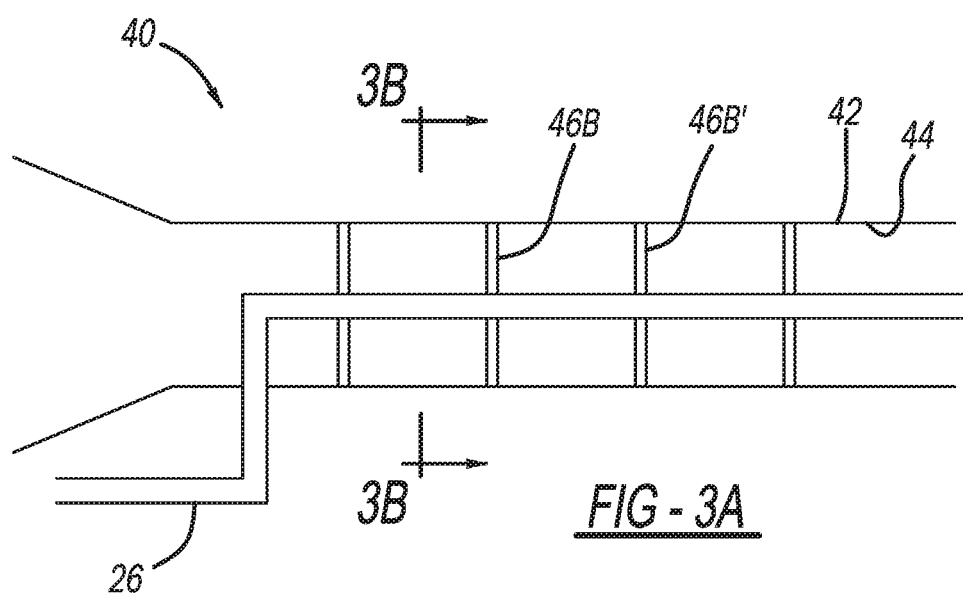
FIG. 3A illustrates another exemplary air circulator of the heat exchanger included with the refrigerant sub cooling system of FIG. 1.
Figure 3B:
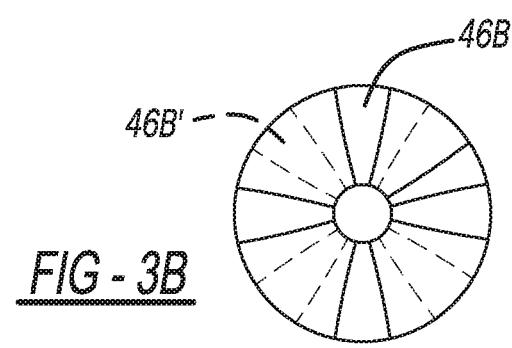
FIG. 3B is a cross-sectional view taken along line 3B-3B of FIG. 3A.

With reference to FIGS. 3A and 3B, another air circulator in accordance with the present disclosure is illustrated at reference numeral 46B. The air circulator 46B includes a plurality of rotational offset fins that are spaced apart along a length of the channel 44. The fins are offset such that fins of neighboring air circulators 46B and 46B' are not aligned with one another. With reference to FIGS. 4A and 4B, an additional air circulator in accordance with the present disclosure is illustrated at reference numeral 46C. The air circulator 46C includes a plurality of fins, each of which extends along a length of the outer wall 42.

With reference to FIG. 5, the refrigerant conduit 26 itself may have a helical shape as it extends through the channel 44. By being helically shaped, the refrigerant conduit 26 of FIG. 5 has an increased surface area within the channel 44, which increases the amount of refrigerant present within the channel 44 and enhances cooling of the refrigerant by the mixture of airflow and mist within the channel 44. Although the refrigerant conduit 26 has a helical shape in the illustration of FIG. 5, the refrigerant conduit 26 can be provided with any other suitable shape and/or configuration to facilitate cooling of the refrigerant therein by the airflow/mist mixture.

The present disclosure thus advantageously provides for a refrigerant subcooling system 10 that utilizes the cooling capacity stored as latent heat inside the condensate water from the evaporator 20 to increase the capacity and efficiency of the air conditioning system 12. The mist of condensate water mixed with the airflow (ram air or airflow from fan 24) cools the refrigerant within the conduit 26. As a result, refrigerant enthalpy at an inlet of the evaporator 20 is lowered, which increases the capacity of the refrigerant to absorb heat from the passenger cabin without increasing energy consumption of the compressor 28, thus improving the overall efficiency of the air conditioning system 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A refrigerant subcooling system comprising:
   a water collector configured to collect water condensate from an evaporator;
   a heat exchanger defining a channel configured to accommodate a refrigerant conduit extending therethrough, the heat exchanger including a water mist generator connected to the water collector by a water line to receive the water condensate from the water collector, the water mist generator is configured to generate a mist of the water condensate that mixes with air flowing through the channel and along the refrigerant conduit to cool refrigerant therein; and
   an air intake duct configured to direct air to the heat exchanger, the air intake duct including a first intake portion configured to receive ram air and direct ram air to the heat exchanger, and a second intake portion configured to receive airflow generated by a fan of an air conditioning system.

2. The refrigerant subcooling system of claim 1, the heat exchanger further including an air circulator configured to circulate air about the refrigerant conduit.

3. The refrigerant subcooling system of claim 2, wherein the air circulator includes a plurality of rotationally offset fins spaced apart along a length of the air circulator.

4. The refrigerant subcooling system of claim 2, wherein the air circulator includes a plurality of fins each extending along a length of channel.

5. The refrigerant subcooling system of claim 2, wherein the air circulator is helically shaped and extends around the refrigerant conduit and along a length of the channel.

6. The refrigerant subcooling system of claim 1, wherein the refrigerant conduit is helically shaped within the channel.

7. The refrigerant subcooling system of claim 1, further comprising a first door movable to direct air from at least one of the first intake portion and the second intake portion;
   wherein the first door is passively controlled such that air flowing through at least one of the first intake portion and the second intake portion moves the first door.

8. The refrigerant sub cooling system of claim 7, further comprising a second door on a downstream end of the heat exchanger, the second door is moved by an actuator to regulate airflow through the heat exchanger.

9. The refrigerant sub cooling system of claim 8, further comprising a humidity sensor arranged to sense humidity of airflow exiting the heat exchanger;
   wherein the actuator is controlled by a control module in receipt humidity data from the humidity sensor, based on the humidity data the control module is configured to operate the actuator to position the second door such that airflow of the heat exchanger has a relative humidity of about 90%.

10. The refrigerant sub cooling system of claim 7, wherein the refrigerant conduit is a conduit of the air conditioning system that circulates refrigerant to the heat exchanger from a condenser, and from the heat exchanger to the evaporator;
    wherein the fan proximate to the condenser draws airflow through the condenser and into the second intake portion of the air intake duct.

11. The refrigerant sub cooling system of claim 10, wherein the heat exchanger lowers a refrigerant enthalpy of the refrigerant to increase a refrigerant's ability to draw heat from an area proximate to the evaporator.

12. An air conditioning system comprising:
    an evaporator;
    a water collector configured to collect water condensate from the evaporator;
    a condenser;
    a fan configured to generate airflow across the condenser;
    a heat exchanger defining a channel configured to accommodate a refrigerant conduit extending therethrough, the heat exchanger including a water mist generator connected to the water collector by a water line to receive the water condensate from the water collector, the water mist generator is configured to generate a mist of the water condensate that mixes with air flowing through the channel and along the refrigerant conduit to cool refrigerant therein; and an air intake duct configured to direct air to the heat exchanger, the air intake duct including a first intake portion configured to receive ram air and direct ram air to the heat exchanger, and a second intake portion configured to receive airflow generated by a fan of an air conditioning system;

wherein the refrigerant conduit extends from the evaporator to the condenser, and from the condenser back to the evaporator, the heat exchanger is arranged along the refrigerant conduit.

13. The air conditioning system of claim 12, further comprising a first door movable to direct air from at least one of the first intake portion and the second intake portion to the heat exchanger;

wherein the first door is passively controlled such that air flowing through at least one of the first intake portion and the second intake portion moves the first door.

14. The air conditioning system of claim 13, further comprising a second door on a downstream end of the heat exchanger, the second door is moved by an actuator to regulate airflow through the heat exchanger.

15. The air conditioning system of claim 14, further comprising a humidity sensor arranged to sense humidity of airflow of the heat exchanger;

wherein the actuator is controlled by a control module in receipt humidity data from the humidity sensor, based on the humidity data the control module is configured to operate the actuator to position the second door such that airflow exiting the heat exchanger has a relative humidity of about 90%.

16. The air conditioning system of claim 12, wherein the heat exchanger lowers a refrigerant enthalpy of the refrigerant to increase the refrigerant's ability to draw heat from an area proximate to the evaporator.

17. The air conditioning system of claim 12, the heat exchanger further including an air circulator configured to circulate air about the refrigerant conduit.

18. The air conditioning system of claim 17, wherein the air circulator includes a plurality of rotationally offset fins spaced apart along a length of the channel.

19. The air conditioning system of claim 17, wherein the air circulator includes a plurality of fins each extending along a length of the channel.

20. The air conditioning system of claim 17, wherein the air circulator is helically shaped and extends around the refrigerant conduit and along a length of the channel.

* * * * *